United States Patent

Koike et al.

[11] 4,097,426
[45] Jun. 27, 1978

[54] CURING AGENTS FOR POLYURETHANE FOAMS AND ELASTOMERS AND PROCESS OF USE

[75] Inventors: Wataro Koike; Masami Takayama, both of Shizuoka; Hideaki Ohashi, Fujieda; Sadayoshi Matsui, Shimizu, all of Japan

[73] Assignee: Ihara Chemical Kogyo Kabushiki Kaisha, Tokyo, Japan

[21] Appl. No.: 735,101

[22] Filed: Oct. 26, 1976

[30] Foreign Application Priority Data

Sep. 29, 1976 Japan .................................. 51-117038

[51] Int. Cl.² ...................... C08G 18/14; C08G 18/32; C09K 3/00
[52] U.S. Cl. .............................. 260/2.5 AM; 252/182; 260/2.5 AZ; 260/77.5 AM
[58] Field of Search ............... 260/77.5 AM, 2.5 AM, 260/2.5 AZ; 252/182

[56] References Cited

U.S. PATENT DOCUMENTS

| | | | |
|---|---|---|---|
| 3,412,071 | 11/1968 | Sundholm | 260/77.5 AM |
| 3,586,649 | 6/1971 | Cobbledick | 260/2.5 AZ |
| 3,598,748 | 8/1971 | Hirosawa | 260/77.5 AM |
| 4,001,180 | 1/1977 | Doyle et al. | 260/2.5 AM |

Primary Examiner—H.S. Cockeram
Attorney, Agent, or Firm—William J. Daniel

[57] ABSTRACT

A curing agent for polyurethane which has a melting point at most 110° C and comprises a mixture of at least two compounds of the general formula:

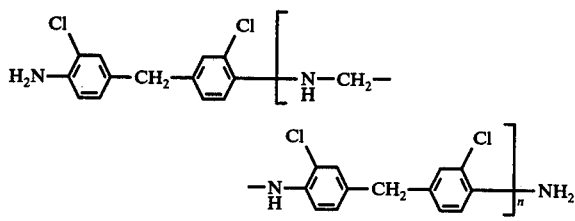

Wherein $n$ is zero or a positive integer.

This curing agent has a low solidifying point and good solubility in solvents and thus is excellent in workability. This curing agent is used for the production of polyurethane highly stabilized in quality.

13 Claims, 3 Drawing Figures

CURING AGENTS FOR POLYURETHANE FOAMS AND ELASTOMERS AND PROCESS OF USE

BACKGROUND OF THE INVENTION

The present invention relates to new curing agents for polyurethane and to a process for producing polyurethane wherein such curing agents are used.

It is well known that 4, 4'-methylene-bis(2-chloroaniline) obtained by condensing o-chloroaniline with formaldehyde in the presence of an acidic catalyst can be used as curing agent for polyurethane. In recent years, a demand for 4, 4'-methylene-bis (2-chloroaniline) is increased rapidly in conformity with rapid development of polyurethane industry. On account of enlargement in the industrial scale for producing polyurethane, there is also a great demand for development of a new type curing agent possessing such a quality as being capable of attaining a high degree of workability and remarkable improvement in physical properties of molded articles.

Usually, 4, 4'-methylene-bis (2-chloroaniline) is superior to other curing agents for polyurethane in imparting excullent molding characteristics to the product but inferior in workability because of a higher melting point inherent to the above compound. In the case of using this compound as curing agent, for example, this compound tended to precipitate before homogeneous mixing with a liquid polyurethane prepolymer has not yet been attained. For attaining thorough mixing with the polyurethane prepolymer, this compound should be molten and added to the preheated prepolymer. In case crystallization of this curing agent takes place too rapidly, curing of the prepolymer will not be attained fully or, if attained, the resultant molded article will be poor in physical characteristies thereof.

In the foregoing situation, various proposals have been reported hitherto for obtaining curing agents having a lower melting point. For example, a method for preparing curing agents for polyurethane which have a low melting point or are liquid wherein a mixture of at least two mononuclear aromatic amines is condensed with an amine is already known (Japanese Patent Publns. Nos. 9484/62, 19062/71, 63797/74, etc.). However, this method has also some drawbacks; the steps for preparing the product become complicate on account of using various kinds of amines and the production of the product with a definite quality becomes difficult because of difficulty in control of the reaction conditions.

On the other hand, the production of a curing composition which has a low melting point or is liquid by reacting the starting amine with an excess amount of an aldehyde is also known (Japanese Patent Publn. No. 16691/70). In this method, however, the condensation reaction for forming a polynuclear compound cannot be carried out uniformly and moreover the reaction tends to give an excessively condensed polynuclear compound. Thus, the use of this curing composition incurs deterioration of the physical properties of the resultant molded articles and makes it difficult to control the quality of the product.

As a result of extensive reserches carried out for developing a low melting point curing agent which overcomes the drawbacks of these prior art curing agents and affords a product with stabilized high quality, it has now been found surprisingly that a low melting point curing agent for polyurethane is obtained by subjecting 4, 4'-methylene-bis (2-chloroaniline) and formaldehyde in a molar ratio of 1:0.01 – 1:0.50 to dehydrocondensation and that the above curing agent permits no deterioration of physical properties of the resultant molded article. The present invention has been accomplished on the basis of the above finding.

BRIEF SUMMARY OF THE INVENTION

In accordance with the present invention, there is provided a curing agent for polyurethane which has a melting point of at most 110° C and comprises a mixture of at least two compounds of the general formula wherein $n$ is zero or a positive integer, the compounds having been prepared by subjecting 4, 4'-methylene-bis (2-chloroaniline) and formaldehyde in a molar ratio of 1:0.01 – 1:0.50 into dehydrocondensation. In accordance with the present invention, there is also provided a process for producing polyurethane elastomer and polyurethane foam with high workability wherein the curing agent is used.

Accordingly, it is an object of the present invention to provide a new curing agent for polyurethane, which has a low solidifying point and can thus be used at a low temperature.

It is another object of the present invention to provide a new curing agent for polyurethane, which has good solubility in solvents and can therefore be used as a highly concentrated solution.

It is still another object of the present invention to provide a new curing agent for polyurethane, which affords molded articles with physical properties not deteriorated.

It is further object of the present invention to provide a curing agent for polyurethane, which, in a mixture with other reactants, gives a long pot life.

It is still further object of the present invention to provide a process for producing polyurethane of high stability in quality wherein the above mentioned new curing agent is used.

It is yet another object of the present invention to provide a process for producing polyurethane with enhanced workability wherein the above mentioned new curing agent is used.

It is yet further object of the present invention to provide a process for producing polyurethane suitable as sealing materials, water-resistant materials and floorboard materials.

It is another additional object of the present invention to provide a process especially suitable for producing polyurethane foam wherein the above mentioned new curing agent for polyurethane is used.

BRIEF DESCRIPTION OF THE DRAWINGS

Other and further objects, features and advantages of the present invention will appear more fully from the following description wherein.

DETAILED DESCRIPTION OF THE INVENTION

The curing agent of the present invention is a mixture of plural kinds of the compounds of the general formula (I) and has such an advantage that the curing has a low solidifying point and good solubility in solvents so that it can be used at a low temperature and can be used as a highly concentrated solution.

The prior art curing agent which comprises polynuclear compounds obtained by reacting the starting amine with excess formaldehyde is shown by the general formula:

(II)

wherein X stands for a substituent and $m$ for an integer, and is characterized in that the aromatic nuclei are bonded through the methylene groups. In contrast, the curing agent of the present invention comprises polyfunctional compounds the aromatic nuclei of which are connected through both secondary amino groups and the methylene groups. Accordingly, the curing agent of the present invention is quite different in chemical structure from the prior art curing agent and exhibits a very peculiar property.

The curing agent of the present invention can be prepared by heating 4, 4'-methylene-bis (2-chloroaniline) and formaldehyde in a molar ratio of 1:0.01 – 1:0.50 in the absence of any catalyst. More specifically, this curing agent can be prepared by heating 4, 4'-methylene-bis (2-chloroaniline) at 95°–150° C until it is molten, adding to the melt under agitation a given amount of formalin or a substance capable of producing formaldehyde such as paraformaldehyde, reacting the mixture for a period of 10 minutes to 3 hours and then removing the formed water by distillation under reduced pressure.

The product thus obtained is a mixture of the compounds represented by the general formula (I). In the mixture are chiefly contained the compounds of the general formula (I) wherein $n$ is 0-3, depending on the molar ratio of the reactants.

The curing agent thus prepared has a low melting point and can thus be used at a low temperature so that it affords a long pot life. In addition, the curing agent has good solubility in solvents and can thus be used as a solution having a high concentration for sealing materials, water-resisting materials, floorboard materials and the like.

The production of polyurethane elastomer using the curing agent of the present invention is carried out by adding the curing agent in molten state to a heated reaction mixture of a polyisocyanate and a polyol or to a polyurethane prepolymer having terminal isocyanate groups, thoroughly stirring the mixture and pouring it into a mold where curing of the polyurethane is attained.

The polyisocyanate used in this process may be any of the known polyisocyanates usually used for the production of polyurethane. Illustrative of such polyisocyanate are, for example, hexamethylene diisocyanate (HMDI), cyclohexyl diisocyanate, 2, 4-tolylene diisocyanate (2, 4-TDI), 2, 6-tolylene diisocyanate (2, 6-TDI), a mixture of 2, 4-TDI and 2, 6-TDI, a dimer or trimer of 2, 4-tolylene diisocyanate, xylylene diisocyanate (XDI), m-xylylene diisocyanate (MXDI), m-phenylene diisocyanate, 4, 4'-biphenyl diisocyanate, diphenyl ether - 4, 4'-diisocyanate, 3, 3'-ditoluene-4, 4'-diisocyanate (TODI), dianisidine diisocyanate (DADI), 4, 4'-diphenylmethane diisocyanate (MDI), 3, 3'-dimethyl-4, 4'-diphenylmethane diisocyanate, 1, 5-naphthanlene diisocyanate (NDI) and triphenylmethane triisocyanate (TTI). Examples of the polyol include aliphatic polyester glyols obtained by chain extension of aliphatic glycols by condensation with dicarboxylic acids, such as polyethylene adipate, polybutylene adipate and polypropylene adipate; polyalkylene ether glycols obtained by decyclopolymerization of ethylene oxide, propylene oxide or tetrahydrofuran, such as polypropylene ether glycol and tetramethylene ether glycol; polyester glycols obtained by decyclopolymerization of lactones such as ε-caprolactone; hydroxyl-terminated polymers such polybutadiene the terminal groups of which are converted into hydroxyl groups; copolymers of at least two alkylene oxides: copolymers of at least two glycols with a dicarboxylic acid; long chain diols such as a mixture of aromatic glycols; polyester polyols obtained by cocondensing a polyol such as glycerol or trimethylolpropane with an aliphatic glycol and a dicarboxylic acid; and polyether polyols obtained by decyclopolymerization of an alkylene oxide such as ethylene oxide, propylene oxide or tetrahydrofuran in the presence of a polyol such as glycerol or trimethylolpropane as initiator.

Examples of the polyurethane prepolymer having terminal isocyanate groups are those produced by reacting the above mentioned polyol with an excess amount of a polyisocyanate. The polyurethane prepolymer are usually isocyanate-terminated prepolymers derived from polyether glycols or polyester glycols, such as a prepolymer (Adiprene, Dupont) prepared from polytetramethylene glycol and an excess amount of tolylene diisocyanate.

The curing agent is used for these reactants usually in such an amount that the total of the primary amino groups and the secondary amino groups in the curing agent is within a range of about 0.8-1.2, preferably 0.9-1.1 equivalent per equivalent of the isocyanate groups, although the amount may vary according to the sorts of the polyol and the polyisocyanate used or the polyurethane prepolymer used.

The production of polyurethane foam using the curing agent of the present invention is carried out according to a generally known method for producing polyurethane foam. More precisely, in a general process for producing polyurethane foam wherein a polyether polyol or a polyester polyol is reacted with a polyisocyanate in the presence of a catalyst and an inflating agent such as a foam regulating agent, a foaming agent or the like, a part of the active hydrogen atoms supplied by the polyol is substituted by the curing agent (the polyamine) of the present invention whereby the foam can be produced according to the semi-prepolymer method or one-shot method. In particular, the use of the curing agent of the present invention serves to enhance workability of the polyurethane.

Thus, the use of the curing agent of the present invention permits the production of polyurethane elestomers or foams with high quality in a very simple operation.

The present invention will now be more clearly understood with reference to the following examples.

EXAMPLE 1

In a 500ml flask were placed 300g (1.12mols) of 4, 4-methylene-bis (2-chloroaniline). This compound was heated at 100°–120° C under agitation in an oil bath until the compound was molten. While maintaining the melt at this temperature, 13.9g (0.373mol) of paraformaldehyde having a purity of 81% were added at a time to the melt under agitation and the mixture was reacted for 1 hour. The dispersed paraformaldehyde disappeared as the reaction proceeded. After completion of the reaction, the reaction mixture was stirred for one hour under a reduced pressure of 20–30mm Hg to effect dehydration while maintaining the reaction mixture at the above mentioned temperature.

Figure 1:
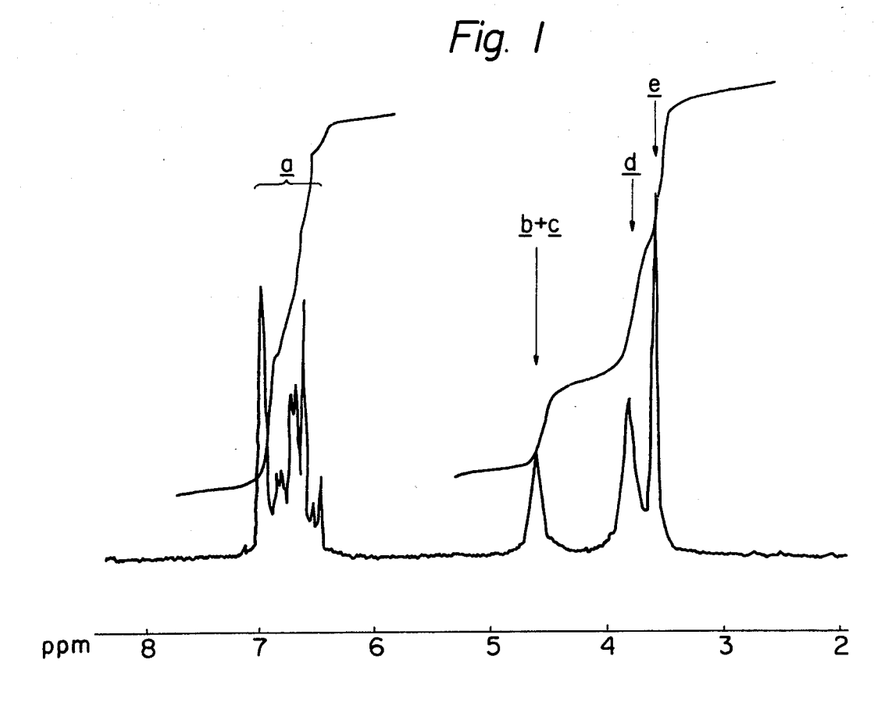
FIGS. 1 and 2 are NMR spectrographs of the curing agents of the present invention.

In this manner, 304g of a condensation product were obtained, which was liquid at room temperature and had a primary amino group content of 7.9%, a total amino group content of 11.8% and a hydroxyl value of 439 KOH mg/g. An MNR spectrograph of this condensation product is shown as FIG. 1 in the accompanying drawings. The position of each proton shown in the spectrograph is indicated in the following structural formula:

shown in the spectrograph is indicated in the following structural formula:

The above NMR spectrographs were subjected to analysis a result of which is shown in Table 1.

Table 1

| Position of proton | | a | b | c | d | e |
|---|---|---|---|---|---|---|
| τ Value | | 6.5–7 | ca.4.6 | ca.4.6 | 3.8 | 3.65 |
| Comparison in intensity of proton | Condensation product | 3 | 0.34 | 0.37 | 1.32 | 1 |
| | 4, 4'-methyl-ene-bis (2-chloroaniline) | 3 | | | 2 | 1 |

EXAMPLES 2–7

The reaction was carried out in the same manner as described in Example 1 except that the mol ratio of 4, 4'-methylene-bis (2-chloroaniline) to paraformaldehyde was varied from 1:0.026 to 1:0.50. The physical properties of the resultant condensation products are shown in Table 2.

Table 2

| Example | Mol ratio of 4,4'-methylene-bis(2-chloro-aniline) to HCHO | Melting point (° C) | Solidifying point (° C) | Primary amino group content (° C) | Total amino group content (° C) | OH Value (KOH mg/g) |
|---|---|---|---|---|---|---|
| 2 | 1:0.026 | 100–105 | 85 | 11.7 | 12.2 | 451 |
| 3 | 1:0.053 | 83–101 | 59 | 11.3 | 12.2 | 466 |
| 4 | 1:0.111 | 73–80 | 48 | 10.6 | 12.1 | 462 |
| 5 | 1:0.143 | 72–78 | 42 | 10.2 | 12.2 | 452 |
| 6 | 1:0.212 | Liquid | — | 9.6 | 11.9 | 443 |
| 7 | 1:0.482 | Liquid | — | 5.8 | 12.0 | 448 |

EXAMPLE 8

Figure 2:
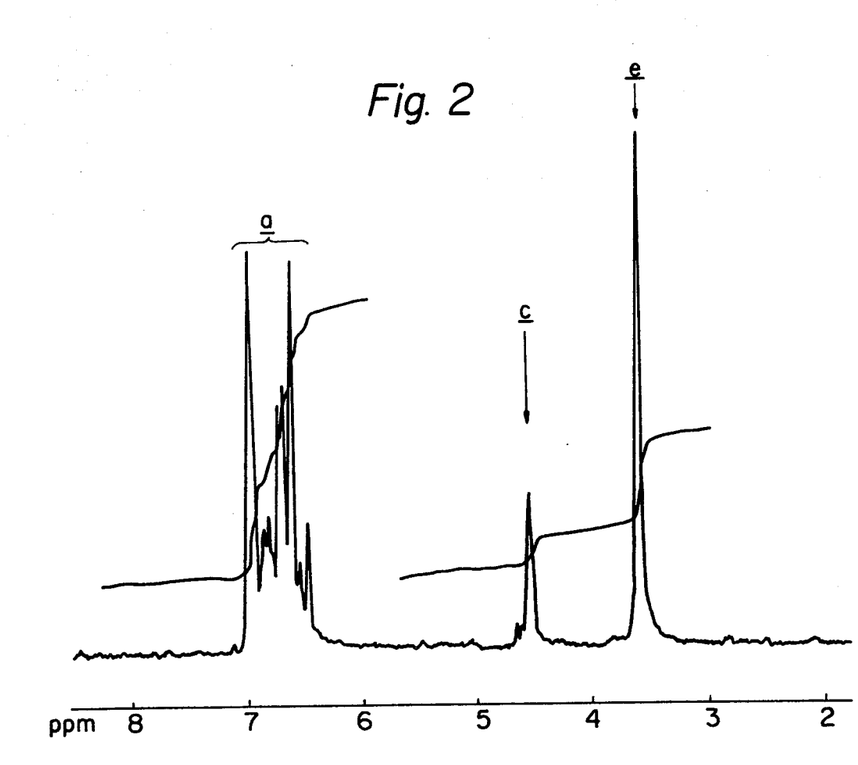

In a flask were placed 250g (0.936mol) of 4, 4'-methylene-bis (2-chloroaniline). This compound was heated at 100°–120° C under agitation in an oil bath until the compound was molten. While maintaining the melt at this temperature, 3.8g (0.0468mol) of formalin containing 38% formaldehyde were added dropwise in 25 minutes to the molten compound under agitation and the mixture was reacted for one hour at this temperature. Crystals were precipitated on addition of the formalin but disappeared as the reaction proceeded. After completion of the reaction, the reaction mixture was FIG. 2 is an NMR spectrograph obtained when the product was treated with heavy water to make absorption of primary amino groups and secondary amino groups extinct.

Figure 3:
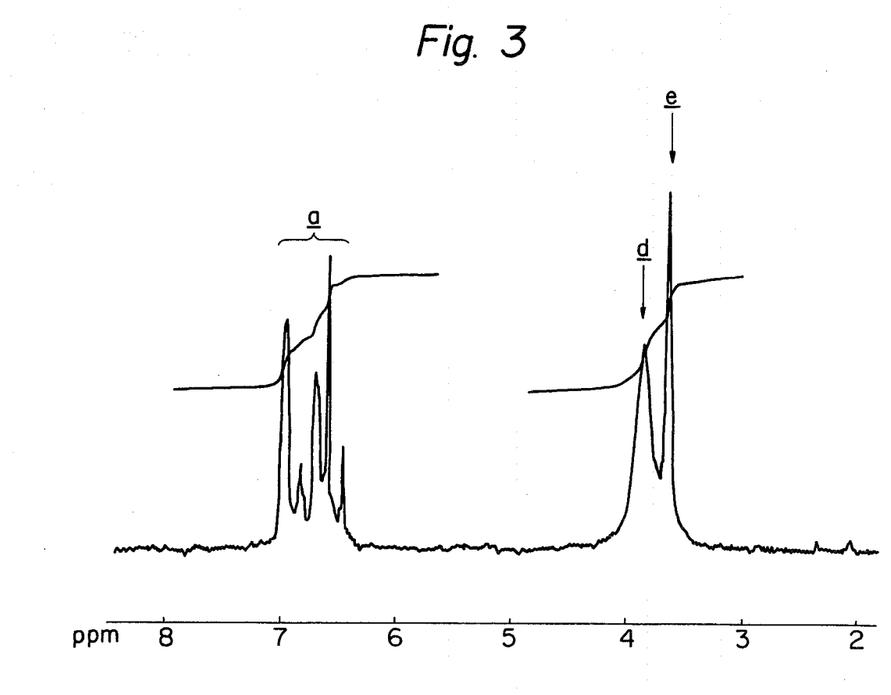
FIG. 3 is an NMR spectrograph of the starting compound.

FIG. 3 is an NMR spectrograph of the starting 4, 4'-methylene-bis (2-chloroaniline) for the purpose of comparison. In this case, the position of each proton stirred for one hour under a reduced pressure of 20–30 mm Hg to effect dehydration while maintaining the reaction mixture at the same temperature whereby 250g of a condensation product were obtained in a yield of 99.8%. The resultant condesation product had a melting point of 80°–103° C, a solidifying point of 57° C, a primary amino group content of 11.4%, a total amino group content of 12.8% and a hydroxyl value of 445 KOH mg/g.

The structure of this condensation product was determined by NMR analysis a result of which is shown in Table 3. For the purpose of comparison, the result obtained for the starting 4, 4'-methylene-bis (2-chloroaniline) is also given in Table 3 below.

Table 3

| Position of proton<br>$\tau$ Value | | a<br>6.5–7 | b<br>Ca.4.6 | c<br>Ca.4.6 | d<br>3.8 | e<br>3.65 |
|---|---|---|---|---|---|---|
| Comparison in intensity of proton | Condensation product | 3 | 0.55 | 0.56 | 1.89 | 1 |
| | 4,4'-methylene-bis (2-chloro-aniline) | 3 | | | 2 | 1 |

In the above table, the position of each proton was indentical with the case previously described. Although the positions of protons b and c were overlapped on absorption, the ratio of b to c was obtained by exchange with heavy hydrogen.

The above result reveals that the condensation product in each Example is obtained by dehydrocondensation of 4, 4'-methylene-bis (2-chloroaniline) with formaldehyde and crosslinking is formed between the amino groups.

The result obtained by using formalin as a source of formaldehyde was found almost same as that obtained in the case of using paraformaldehyde.

Referential Example

In the case of using polyurethane, for example, as floorboard materials, it is necessary to use the curing agent dissolved in a solvent. Thus, a solubility test was performed for the curing agent of the present invention and 4, 4'-methylene-bis (2-chloroaniline) as control, using polyethyleneglycol dibenzoate (EB-200 manufactured by Sanyo Kasei, Japan; the average molecular weight of the glycol: about 200) which is most widely employed as a solvent for floorboard materials. A result of this solubility test is shown in Table 4.

Table 4

| Sort of the curing agent | Solubility (%) |
|---|---|
| The product obtained in Example 1 | 50 – 55 |
| The product obtained in Example 2 | 45 – 50 |
| The product obtained in Example 3 | 50 – 55 |
| The product obtained in Example 4 | 50 – 55 |
| The product obtained in Example 5 | 55 – 60 |
| The product obtained in Example 6 | 55 – 60 |
| The product obtained in Example 7 | 55 – 60 |
| The product obtained in Example 8 | 45 – 50 |
| Control | 38 |

As is evident from the tabulated result, the curing agents of the present invention are 10–20% higher in solubility than 4, 4'-methylene-bis (2-chloroaniline) used as control. Accordingly, the curing agents of the present invention can be used as a highly concentrated solution.

Of particular importance is improvement in hygienic environment for working. In case urethane resins are used as floorboard materials or sealing materials, the curing agent is generally dissolved in a solvent in the working place. In the case of using the known conventional curing agent, it should be heated and dissolved at an elevated temperature in a solvent to attain a desired solubility. In this case, however, a harmful or taxic vapor of the amine curing agent is evolved and, as the result, hygienic environment for working is seriously damaged. This problem can be solved by the present invention because the curing agent can be dissolved in a solvent at a low temperature to give a concentrated solution as is evident from the above table and evolution of the harmful or toxic vapor of the curing agent can thus be avoided during the operation for producing polyurethane elastomers of the desired physical properties.

Below are examples illustrating the method for using various condensation products obtained in accordance with the procedure in the foregoing examples as curing agent for urethane prepolymer.

EXAMPLE 9

Adiprene L-100 (Du Pont, U.S.A.) was used as urethane prepolymer which is a liner polymer prepared from polytetramethylene glycol and tolylene diisocyanate and has 4.21% of active isocyanate groups and an average molecular weight of about 2000. The amount of the various condensation products used as curing agent for the prepolymer was calculated from the total amino group content of the condesation products. More particularly, the amount of the various curing agents was calculated from the amine value thereof so that the total amine equivalent of the curing agent might be 0.95 per equivalent of Adiprene L-100.

For 140 parts by weight of Adiprene L-100 were used 17.8 parts by weight of the curing agent obtained in Example 1. The prepolymer was heated at 100° C and the curing agent molten at 100° C was added therto and the mixture was stirred for 2 minutes. This mixture was poured into a mold (15cm × 20cm × 2mm) and cured at 100° C for one hour. After releasing from the mold, the molded article was further cured at 80° C for 15 hours. The remaining portion of the mixture was placed in an air bath kept at 100° C, and the time from the moment of mixing the curing agent with the prepolymer till the moment of the mixture becoming incapable of being poured into the mold was measured and recorded as pot life. The measurement of physical properties of the cured elastic sheet gave the following result:

| Tensile strength | 152 kg/cm$^2$ | Elongation 280% | 100% modulus | 28 kg/cm$^2$ |
|---|---|---|---|---|
| Hardness (Shore A) | 70 | Tear strength 13 kg;cm | Rebound eleslicity | 24% |
| Pot life | 23 minutes. | | | |

This elastic sheet was found suitable as floorboard materials or sealing materials.

Using the condensation products obtained in Examples 2–8 as curing agent, polyurethane elastomers were produced in the same manner as described above. The physical properties of the resultant polyurethane elastomer sheets and the pot life on molding are shown in Table 5.

Table 5

| Curing agent | Mole ratio 4,4'-methylene-bis (2-chloroaniline) / HCHO | Tensile strength (kg/cm²) | Elongation (%) | Modulus (kg/cm²) 100% | Modulus (kg/cm²) 300% | Hardness (Shore A) | Tear strength (kg/cm) | Rebound elasticity (%) | Pot life 100° C (min) |
| --- | --- | --- | --- | --- | --- | --- | --- | --- | --- |
| Example 2 | 1 / 0.026 | 521 | 420 | 74 | 179 | 94 | 45 | 49 | 14 |
| Example 3 | 1 / 0.053 | 412 | 390 | 67 | 179 | 92 | 40 | 45 | 14 |
| Example 4 | 1 / 0.111 | 357 | 360 | 59 | 186 | 87 | 31 | 36 | 15 |
| Example 5 | 1 / 0.143 | 373 | 370 | 30 | 115 | 74 | 20 | 35 | 16 |
| Example 6 | 1 / 0.212 | 264 | 330 | 28 | 133 | 70 | 17 | 23 | 18 |
| Example 7 | 1 / 0.482 | 126 | 220 | 23 | — | 68 | 12 | 23 | 25 |
| Example 8 | 1 / 0.053 | 509 | 410 | 76 | 180 | 94 | 44 | 50 | 14 |

Remarks:
The condensation product described as curing agent in Example 8 was obtained by using formalin as a substance capable of producing formaldehyde.

As is evident from Table 5, polyurethane elastomers having versatile physical properties suited for various applications can be produced accroding to the present invention.

EXAMPLE 10

The prepolymer was treated in the same manner as described in Example 9 except that the curing agent was used in such an amount that the primary amino groups of the curing agent were 0.95 equivalent per equivalent of the isocyanate groups of the prepolymer. More precisely, 25.1 parts by weight of the curing agent obtained in Example 1 were used for 140 parts by weight of Adiprene L-100 and the mixture was treated in the same manner as described in Example 9 to produce a polyurethane elastomer. The physical properties of the resulting polyurethane elastomer were as follows:

| Tensile strength | 384 kg/cm² | Elongation | 380% | 100% Modulus | 106 kg/cm² |
| --- | --- | --- | --- | --- | --- |
| Hardness (Shore A) | 73 | Tear strength | 24 kg/cm | Rebound elasticity | 20% |
| Pot life | 19 minutes | | | | |

Using the condensation products obtained as curing agent in Examples 2-6, polyurethane elastomers were produced in the same manner as described above. The physical properties of the resultant polyurethane elastomer sheets and the pot life on molding are shown in Table 6.

Table 6

| Curing Agent | Mol ratio 4,4'-methyl-bis (2-chloroaniline) / HCHO | Tensile strength (kg/cm²) | Elongation (%) | Modulus kg/cm² 100% | Modulus kg/cm² 300% | Hardness (Shore A) | Tear Strength (kg/cm) | Rebound elasticity (%) | Pot life 100° C (min) |
| --- | --- | --- | --- | --- | --- | --- | --- | --- | --- |
| Example 2 | 1 / 0.026 | 481 | 430 | 79 | 178 | 95 | 51 | 48 | 14 |
| Example 3 | 1 / 0.053 | 452 | 420 | 81 | 184 | 95 | 48 | 46 | 15 |
| Example 4 | 1 / 0.111 | 530 | 450 | 75 | 170 | 93 | 50 | 44 | 13 |
| Example 5 | 1 / 0.143 | 443 | 430 | 66 | 156 | 90 | 46 | 40 | 14 |
| Example 6 | 1 / 0.212 | 395 | 400 | 35 | 104 | 82 | 32 | 28 | 14 |

As is evident from Table 6, the operation can be carried out at a low temperature and polyurethane elastomers having versatile physical properties can be obtained according to the present invention.

Comparative Example 1

In this comparative example, 4,4'-methylene-bis (2-chloroaniline) was used as curing agent for producing a polyurethane elastomer.

Using 17.8 parts by weight of 4,4'-methylene-bis (2-chloroaniline) for 140 parts by weight of Adiprene L-100, a polyurethane elastomer sheet was produced in the same manner as described in Example 9. In this case, however, heating of Adiprene L-100 up to 120° C was needed for dissolving the curing agent therein. A vapor of the amine curing agent was evolved by such heating, thus providing undesirable enviroment for hygienity of workers. The physical properties of the resultant polyurethane elastomer sheet and the pot life on molding were as follows:

| Tensile strength | 436 kg/cm² | Elongation | 450% | 100% Modulus | 79 kg/cm² |
| --- | --- | --- | --- | --- | --- |
| 300% Modulus | 157 kg/cm² | Hardness (Shore A) | 95 | Tear strength | 56 kg/cm |
| Rebound elasticity | 55% | Pot life | 12 minutes | | |

EXAMPLE 11

This example is an example for producing polyurethane foam according to one-shot method using the curing agent of the present invention.

Using an automatic molding machine of two liquid component system, polyurethane foam was produced according to one-shot method using the condensation product of Example 3 as curing agent. The two liquid components were of the following composition:

| Liquid A | |
| --- | --- |
| Ingredients | Parts by Weight |
| Polyethylene adipate having an average molecular weight of 1000 (OH value: 106–118 KOH mg/g) | 100 |
| The condensation product of Example 3 as curing agent | 16.9 |
| Silicone oil | 2.0 |
| Stannous octanoate | 0.1 |
| Triethylenediamine | 0.7 |
| Water | 0.25 |
| Liquid B | |
| MDI | 45.2 parts by weight |

Both liquids were mixed so that the isocyanate index might become 1.05.

| Physical properties of the resulting foam | |
|---|---|
| Hardness (Shore A) | 40 |
| Density (g/cm³) | 0.48 |
| Tensile strength (kg/cm³) | 24 |
| Elongation (%) | 210 |
| Tear strength (kg/cm) | 17 |

A polyurethane foam was produced in the same manner as described above except that 18 parts by weight of the condensation product obtained in Example 4 were used as curing agent. The physical properties of the resulting polyurethane foam were as follows:

| Hardness (Shore A) | 32 |
|---|---|
| Density (g/cm³) | 0.51 |
| Tensile strength (kg/cm²) | 20 |
| Elongation (%) | 200 |
| Tear strength (kg/cm) | 18 |

Comparative Example 2

A polyurethane foam was produced in the same manner as described in Example 11 except that 15.9 parts by weight of 4, 4'-methylene-bis (2-chloroaniline) were used as curing agent. The physical properties of the resultant foam were as follows:

| Hardness (Shore A) | 38 |
|---|---|
| Density (g/cm³) | 0.43 |
| Tensile strength | 26 |
| Elongation (%) | 230 |
| Tear strength (kg/cm) | 19 |

What is claimed is:

1. A curing agent for polyurethane which comprises a mixture which is solid at room temperature and has a melting point of at most 110° C of at least two compounds represented by the general formula:

wherein $n$ stands for zero or a positive integer and is greater than zero in at least one of said compounds,
the compounds having been prepared by subjecting to dehydrocondensation 4, 4'-methylene-bis (2-chloroaniline) and formaldehyde in a molar ratio sufficient to produce a solid mixture of reaction products.

2. A curing agent for polyurethane according to claim 1 wherein said compounds have been prepared by subjecting said 4, 4'-methylene-bis (2-chloroaniline) and formaldehyde to dehydrocondensation conducted at 95°–150° C for a period from 10 minutes to 3 hours.

3. A curing agent for polyurethane according to claim 1 wherein $n$ is 0–3.

4. A process for the production of polyurethane which comprises reacting a mixture of a polyisocyanate and a polyol or polyurethane prepolymer having terminal isocyanate groups with a curing agent, characterized by using as said curing agent a mixture which is solid at room temperature and has a melting point of at most 110° C of at least two compounds represented by the general formula:

wherein $n$ stands for zero or a positive integer and is greater than zero in at least one of said compounds,
said compounds having been prepared by subjecting to dehydrocondensation 4, 4'-methylene-bis (2chloroaniline) and formaldehyde in a molar ratio sufficient to produce a solid mixture of reaction products.

5. A process for the production of polyurethane according to claim 4 wherein a mixture of the compounds of said general formula obtained by subjecting said 4, 4'-methylene-bis (2-chloroaniline) and formaldehyde to dehydrocondensation conducted at 95°–150° C for a period from 10 minutes to 3 hours is used as said curing agent.

6. A process for the production of polyurethane according to claim 4 wherein $n$ is 0–3.

7. A process for the production of polyurethane according to claim 4 wherein said curing agent is used in such an amount that a total of the primary amino groups and the secondary amino groups in said curing agent may be within a range of 0.8–1.2 equivalents per equivalent of the isocyanate groups of said polyisocyanate or said polyurethane prepolymer.

8. A process for the production of polyurethane which comprises reacting a mixture of a polyol and a polyisocyanate or a polyurethane prepolymer having terminal isocyanate groups with a curing agent in the presence of a blowing agent, characterized by using as said curing agent a mixture which is solid at room temperature and has a melting point of at most 110° C of at least two compounds represented by the general formula:

wherein $n$ stands for zero or a positive integer and is greater than zero in at least one of said compounds,
said compounds having been prepared by subjecting to dehydrocondensation 4, 4'-methylene-bis (2- chloroaniline) and formaldehyde in a mol ratio sufficient to produce a solid mixture of reaction products.

9. A process for the production of polyurethane according to claim 8 wherein a mixture of the compounds of said general formula obtained by subjecting said 4,4'-methylene-bis (2-chloroaniline) and formaldehyde to dehydrocondensation conducted at 95°–150° C for a period from 10 minutes to 3 hours is used as said curing agent.

10. A process for the production of polyurethane according to claim 8 wherein $n$ is 0–3.

11. A curing agent as in claim 1 wherein said molar ratio of said (2-chloroaniline) to formaldehyde is at least about 9:1.

12. A curing process as in claim 4 wherein said molar ratio of said (2-chloroaniline) to formaldehyde is at least about 9:1.

13. A curing process as in claim 8 wherein said molar ratio of said (2-chloroaniline) to formaldehyde is at least about 9:1.

* * * * *